United States Patent [19]
Sheldon et al.

[11] 3,728,896
[45] Apr. 24, 1973

[54] DYNAMIC TORQUE MEASURING SYSTEM

[75] Inventors: Loren B. Sheldon, Long Beach, Calif.; Lester Lee Cain, Ethell; J. Dower, Houston, both of Tex.

[73] Assignee: Drill-Au-Mation Inc., Houston, Tex.

[22] Filed: Dec. 17, 1970

[21] Appl. No.: 128,597

[52] U.S. Cl..................................................73/136
[51] Int. Cl...............................................G01l 3/10
[58] Field of Search ..................73/136 A, 136 C, 73/136 R

[56] References Cited

UNITED STATES PATENTS

| | | | |
|---|---|---|---|
| 3,319,464 | 5/1967 | Bender | 73/136 A |
| 2,651,197 | 9/1953 | Crookston et al. | 73/136 D |
| 2,403,952 | 7/1946 | Ruge | 73/136 C |
| 3,128,622 | 4/1964 | Lebow | 73/136 C |
| 3,000,208 | 9/1961 | Piazza, Jr. | 73/136 A |
| 3,134,279 | 5/1964 | Sims et al. | 73/136 A X |
| 3,350,944 | 11/1967 | Michele | 73/136 A UX |
| 3,664,184 | 5/1972 | Dyer | 73/136 A |

FOREIGN PATENTS OR APPLICATIONS

| | | | |
|---|---|---|---|
| 984,540 | 2/1965 | Great Britain | 73/136 A |
| 997,723 | 7/1965 | Great Britain | 73/136 A |
| 939,175 | 10/1963 | Great Britain | 73/136 C |
| 71,214 | 5/1970 | Germany | 73/136 C |

*Primary Examiner*—Charles A. Ruehl
*Attorney*—Donald H. Fidler

[57] ABSTRACT

A system forming part of subterranean well drilling apparatus for measuring torque between a rotating drive element and a rotating driven element connected between the driving and driven elements, a strain detection and transmitting system connected with the coupling element and carried by the rotating elements for continuously detecting the transient strains imposed in the coupling element by torque between the driving and driven elements and for transmitting a radio output indicative thereof, and a stationary radio receiver system for receiving and indicating such output as a function of torque and torque variations between the driving and driven elements.

26 Claims, 12 Drawing Figures

INVENTORS.
LOREN B. SHELDON
LESTER L. CAIN
BY ETHELL J. DOWER
John O. Evans, Jr.
James M. Pappas

INVENTORS.
LOREN B. SHELDON
LESTER L. CAIN
BY ETHELL J. DOWER
John O. Evans, Jr.
James M. Pepper

DYNAMIC TORQUE MEASURING SYSTEM

BACKGROUND OF THE INVENTION

The invention generally relates to a system for accurately detecting the torque and transient variations thereof between rotating elements of a rotating structure and for transmitting a high fidelity output indicative of such torque to a remote indicator, and is especially applicable to the measurement of the torque required to rotate a string of drill pipe in a subterranean well bore.

There is a definite need to ascertain the torque developed to rotate a drill string within a well bore and the transient peaks of torque developed during drilling operations.

Drilling torque measuring systems presently in general use involve an idler roller placed in position to deflect the tension or driving side of the chain drive to the rotary mechanism used to rotate the drill pipe. The force required to deflect the drive chain is correlative to the torque required to rotate the drill pipe. Apparatus (generally hydraulic) is provided to detect the deflection force required and to indicate or record the same as an indication of torque. More detailed explanation of such system is made on pages 1862, 2138, 2903, 3237-3239 and 4574 of the 1970-71 edition of the COMPOSITE CATALOG OF OIL FIELD EQUIPMENT AND SERVICES, published by Gulf Publishing Company, Houston, Texas, hereinafter referred to as the COMPOSITE CATALOG. Such systems are generally satisfactory but are not as accurate as is desirable at times. More important, such systems inherently give a dampened or average indication of torque due to elastic strain of the various connecting elements and do not detect transient peaks of torque. Detection of such transient peaks is very important at times since the same may be a function of impact loading which must be considered in the construction, provision and operation of drilling equipment.

Another drilling torque measuring system involves the use of electrical strain resistors attached to a specially constructed sprocket included in the chain drive of the rotary drilling mechanism. Such strain resistors deflect with the internal strain of the sprocket and exhibit an electrical resistance variation which is a function of torque. The resistors are electrically connected through a slip ring assembly mounted on the rotating sprocket shaft and a stationary electrical brush pickup assembly to a potential detection and indication system. A system of this kind is disclosed in a technical paper entitled ROTARY TABLE TORQUE TRANSDUCER which was presented at the 1969 Fall meeting of the Society for Experimental Stress Analysis, located at 21 Bridge Square, Westport, Conn. This system is an improvement to the chain deflection system in that better indication is given of transient peaks in drilling torque. However, a considerable number of power transmission elements subject to strain remain between the strain resistors and the drill pipe to lend an averaging effect to applied torque. Also, the power train to the drilling mechanism must be modified to accommodate the special chain sprocket and slip ring assembly with attendant expense for an otherwise standard drilling unit. The electrical slip ring assembly can be a source of malfunction in this type of torque measuring system.

The measurement of torque through strain measurement apparatus has been previously developed as shown in U.S. Pats. Nos. 2,392,293, 3,290,930, 3,314,034 and 3,422,445, for example. Systems for telemetering the output of strain circuits have also been developed as shown in U.S. Pats. Nos. 2,555,355, 3,350,944 and 3,062,043, for example. Reference is also made to Technical Paper No. 69-554 entitled WIRELESS TEMPERATURE AND STRAIN Measurement and presented at the 1969 conference of the Instrument Society of America, located at 530 William Penn Place, Pittsburgh, Pa. 15219 (hereinafter referred to as STRAIN MEASUREMENT).

SUMMARY OF THE INVENTION

The drilling torque measuring system of the present invention is sensitive to small changes in torque and also sensitive to very rapid transient peaks in applied torque. The system may be provided readily as an integral unit easily assimilated into existing well drilling equipment and at reasonable cost. The system as provided is inherently compensated for drift caused by change of temperature and for non-linearity.

An object of this invention is to provide a torque measuring system of superior fidelity and accuracy.

Another object of this invention is to provide a torque measuring system compensated for changes in temperature.

A further object of this invention is to provide a drilling torque measuring system which produces an analog function indicating drilling torque.

Yet another object of this invention is to provide a torque measuring system which accurately indicates very fast transient peaks and variations in drilling torque.

These and other objects and advantages are attained in the drilling torque measuring system shown and described herein including a rotatable strainable elastic coupling means adapted for connection between a rotating driving element and a rotating driven element for rotation therewith, a strain detection and transmitting means included in the coupling means and adapted to be carried with the rotating elements for continuously detecting the strain and changes thereof imposed in the coupling member by torque applied between the driving and driven elements and for transmitting an output indicative thereof, and a stationary receiver means radiocoupled to the transmitter means for receiving and indicating such output as a linear function of the torque and torque variations between the driving and the driven elements.

DESCRIPTION OF THE PREFERRED EMBODIMENTS

Referring to FIGS. 1-4, the structure of the present invention is shown mounted in operating position with a rotary drilling apparatus or rotary table 10, a portion of which is shown, which is mounted on a drilling support structure including structural beams 12. Rotary table 10 includes a rotary drive member 14 mounted within a housing 16 which in turn is mounted on beam 12. Nested within drive member 14 and adapted to be driven in rotation thereby is a drive bushing or master bushing 18. Such rotary drilling apparatus and equipment driven thereby is presently used and commonly known in the art. For further representative description, reference may be made to pages 3496-3498 of the COMPOSITE CATALOG, such description being expressly incorporated herein by reference.

Figures 1, 1A:
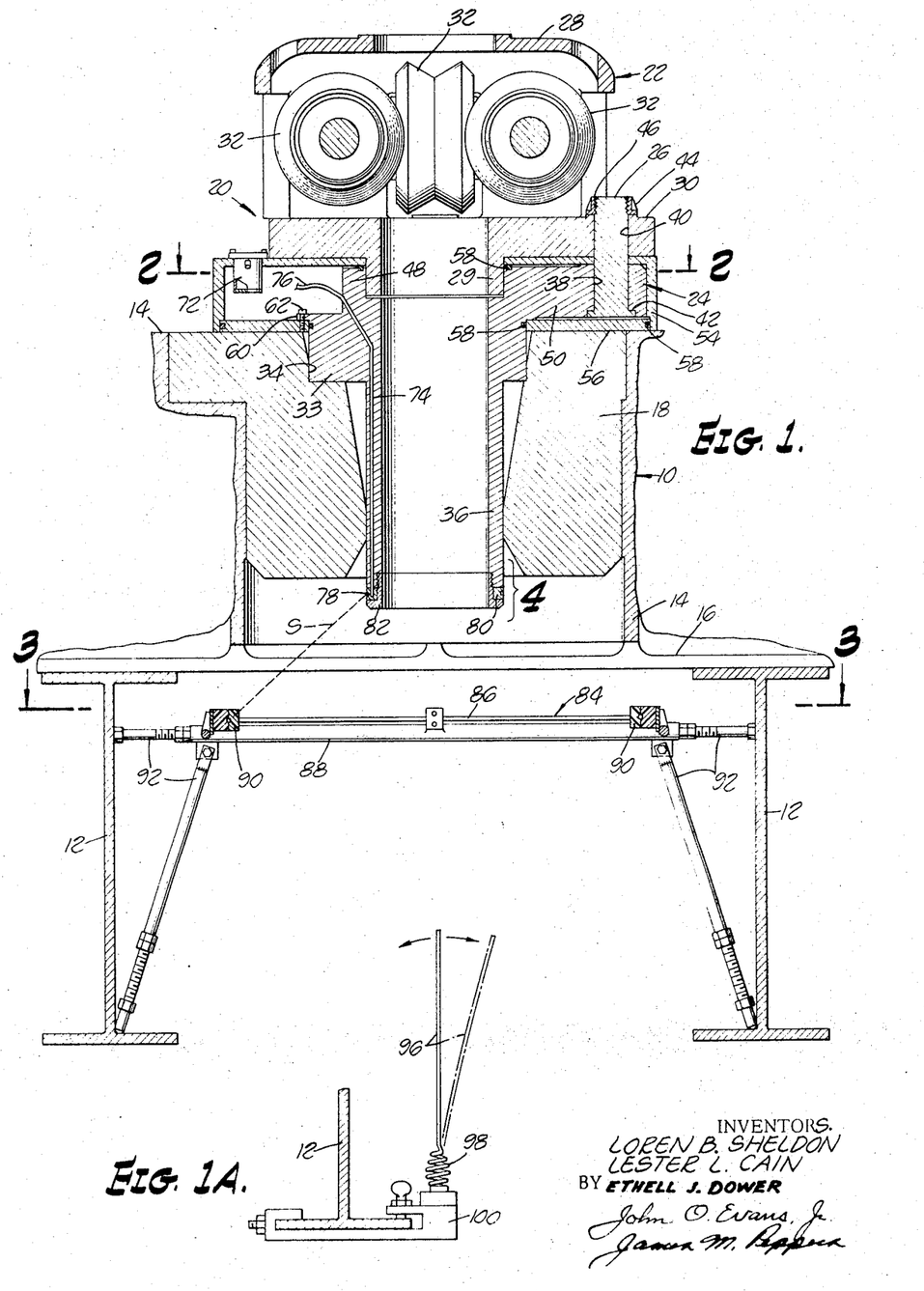
FIG. 1 is a vertical sectional view of a portion of presently used drilling apparatus with incorporation of one embodiment of the torque measuring apparatus of this invention and taken along the line 1—1 of FIG. 2.
FIG. 1a is an alternate embodiment of a receiving antenna shown in FIG. 1.

Mounted above and within master bushing 18 is a Kelly driving assembly 20 which generally includes a roller Kelly drive bushing or kelly bushing 22 connected to a Kelly coupling member 24 through shouldered Kelly drive pins 26.

Kelly bushing 22 forms a housing 28 and a base 30. The Kelly bushing housing incorporates a plurality of Kelly drive roller assemblies 32 which are adapted to receive the polygonal stem of a drill pipe Kelly (not shown). The Kelly bushing 22 of the pin drive type (shown again in FIG. 5) is recently becoming more generally used and is commonly known. For further description, reference may be made to pages 192-207 of the COMPOSITE CATALOG, such description being expressly incorporated herein by reference.

Coupling member 24 is formed with a polygonal, generally square, drive shank 33 which is received in a correspondingly shaped drive socket 34 formed in master bushing 18. Extending below shank 33 through master bushing 18 is a guide sleeve 36. Base 30 defines an alignment sleeve 29 extending into a counterbore defined in coupling member 24.

As previously mentioned, coupling member 24 is connected to the base 30 of drive bushing by means of shouldered drive pins 26 which extend through holes 38 and 40 defined in coupling member 24 and base 30, respectively, such pins being retained in connecting relation means of shoulders 42 on one end of the pins 26 and a threaded nut 44 connected on the other end of such pins. The nuts 44 are locked to pins 26 with suitable means such as tack welds 46 to prevent disassembly of drive assembly 20 which undergoes substantial vibration and impact loading during operation of the drilling apparatus.

As now apparent, rotation of drive member 14 drives the Kelly coupling member 24 through shank 33 which carries the Kelly drive bushing 22 in rotation. Drive roller assemblies 32 in turn drive a Kelly (not shown) which is connected to and rotates a drill pipe and drill bit within a well bore.

Figure 2:
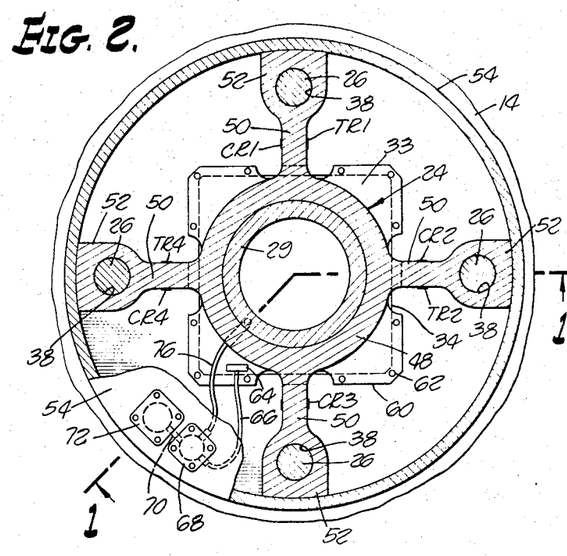
FIG. 2 is a horizontal sectional view, partly in plan, taken along the line 2—2 of FIG. 1.

Referring to FIG. 2, Kelly coupling member 24 is seen to include a central circular hub 48 extending from shank 33 and a plurality of strainable and elastic deflection levers or beams 50 radially extending in cantilever posture from hub 48 in equally spaced relation. Each deflection beam 50 terminates at the radially extended end with a carrier boss 52 which has defined therein the hole 38 receiving the drive pin 26.

As can be seen with reference to FIGS. 1 and 2, the deflection beams 50 are uniformly rectangular in cross section and are machined and tempered or heat treated to exhibit flexure characteristics whereby the torque stress applied between the hub 48 and the drive 26 impose a strain on the beams 50 which is a direct function of the torque stress applied and which varies therewith in essentially linear relation.

The strain caused by such torque in each of the beam 50 results in tensional displacement of the beam material on one side of the beam and compressional displacement of the beam material on the other side of such beam. Strain sensing means are provided to sense the strain displacement occurring in the beams 50 in response to torque stress applied. As best seen in FIG. 7, such sensing means are preferably provided as electrical strain resistors or strain gauges integrally attached to the sides of each of the beams 50 at a point where strain displacements occur. For convenience in nomenclature with reference to FIG. 7, and later with reference to FIGS. 2, 6 and 8-11, the strain resistors mounted to sense compressive displacement of the beams 50 are generally designated CR and the strain resistors mounted to sense tensional displacement of such beams are generally designated TR.

As generally known, strain resistors exhibit an increase in electrical resistance when stretched and a decrease in electrical resistance when compressed. When mounted as shown in FIG. 7, the strain sensing resistors TR1 – TR4 exhibit an increase in electrical resistance as a substantially linear function of the tensional strain displacement of the beams 50 and consequently the torque imposed in the coupling member 24. Concurrently the strain sensing resistors CR1 – CR4 exhibit a decrease in electrical resistance as a substantially linear function of the compressional displacement of beams 50 as imposed by such torque. The strain resistors are electrically connected into a detection circuit as later described.

Referring again to FIGS. 1 and 2, the bosses 52, beams 50 and hub 48 are partially enclosed in a circular dished housing 54. Completing such enclosure is an annular closure member 56 counted between a skirt portion of housing 54 and shank 33 and attached to a flange 60 extending about the circumference of shank 33 by means of a plurality of fasteners 62. O-ring seals 58 are disposed as shown at the junction of hub 48, closure member 56 and housing 54 to exclude the dirt and drilling mud normally coating everything around during operation of the drilling equipment.

The strain resistors TR1 – TR4 and CR1 – CR4 are connected as later described through a terminal block 64 and lead 66 to a detector and transmitter package or unit 68 which is received in an opening defined in the horizontal surface of housing 54 and attached thereto. Power to transmitter unit 68 is supplied through a lead 70 from a power or battery unit 72, also received in the fastened to housing 70.

Transmitter unit 68 houses the later described detection and transmitter circuits and the transmitter unit 68 and battery unit 72 may be quite small, for example, about the diameter of a 25 cent coin.

A passageway 74 is defined through guide sleeve 36, drive shank 33 and a portion of hub 48 as shown, to accommodate a lead 76 connecting transmitter unit 68 to a transmitter antenna 78. As better shown in FIG. 4, antenna 78 defines an interrupted circle in configuration and is potted in an insulating carrier 80. Carrier 80 is retained in fixed coaxial 12 by with guide sleeve 36 by means of a threaded and shouldered bushing 82 which is threaded into accommodating threads provided within sleeve 36 as shown.

Figure 3:
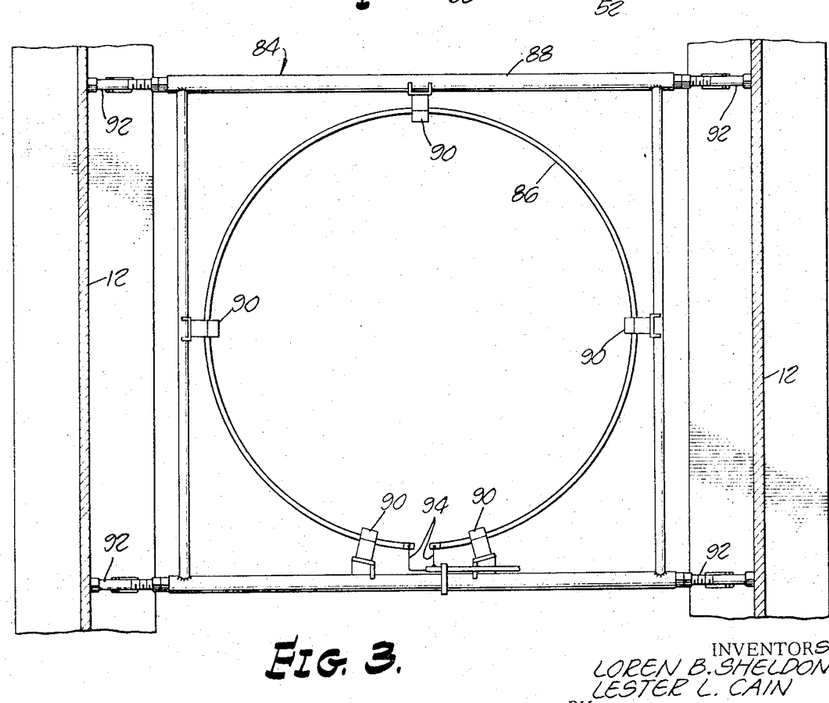
FIG. 3 is a horizontal sectional view, partly in plan, taken along the line 3—3 of FIG. 1.
Figure 4:
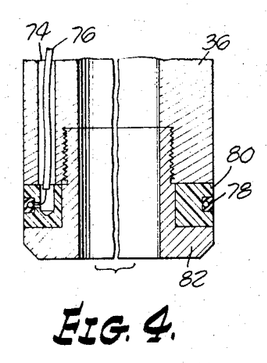
FIG. 4 is an enlarged sectional view of a portion of FIG. 1 as indicated thereon.

Referring to FIGS. 1 and 3, a receiving antenna assembly 84 is mounted below rotary table 10 and between beams 12. Assembly 84 includes a receiving antenna 86 which may be an interrupted circle in configuration as shown, and is mounted within a rectangular support frame 88 by means of insulating brackets 90. Frame 88 is mounted in braced relation between beams 12 by means of suitable leg bolts 92, as shown. Receiving antenna 86 is connected to a receiving circuit (not shown) through suitable leads 94.

Of note is that the transmitting antenna and receiving antenna structures as provided and shown afford line-of-sight radio transmission, designated as S, therebetween. Such feature is important when employing the commonly used higher telemetering frequencies. Also of note is that the radio transmission-receiving environment is effectively shielded from extraneous interference by the metal mass of the rotary table 10, beams 12 and support structure below (now shown).

FIG. 1a schematically depicts an alternate "whip" type receiving antenna assembly which includes an antenna 96 connected through a deflection coil 98 to a mounting clamp 100 which in turn is adapted for attachment to one of the beams 12 as shown. Such alternate structure additionally provides some advantages such as more convenience and flexibility of installation.

Figure 5:
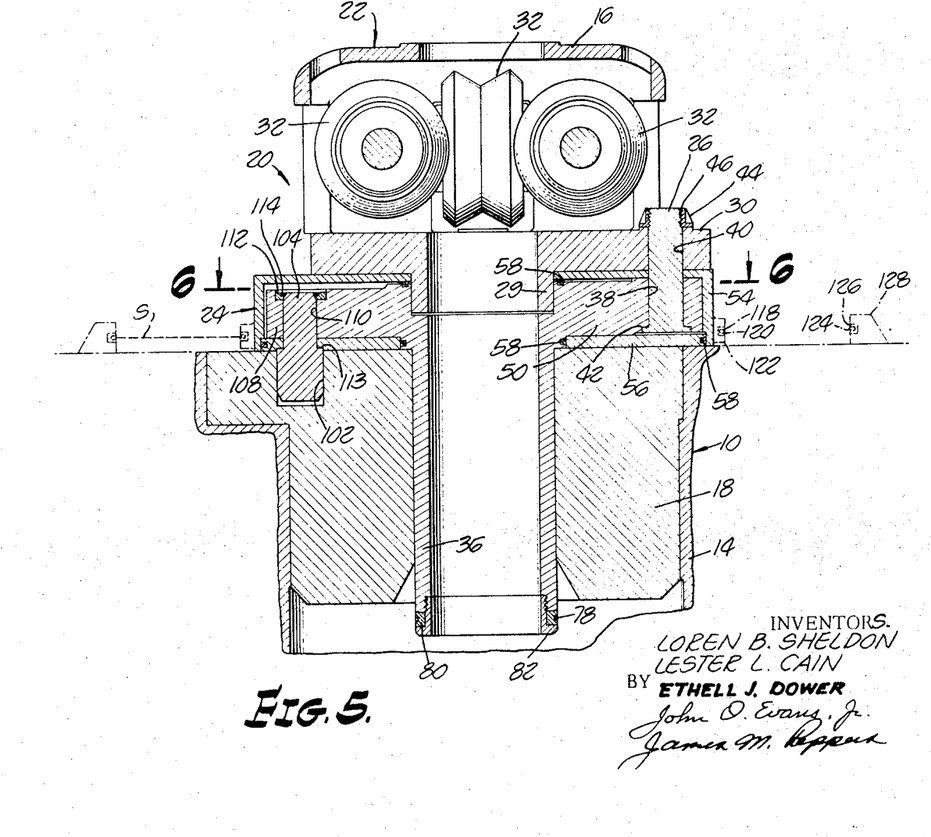
FIG. 5 is a vertical sectional view of a portion of a newer type of drilling apparatus with incorporation of an accommodating embodiment of the torque measuring apparatus of this invention and taken along the line 5—5 of FIG. 6.
Figure 6:
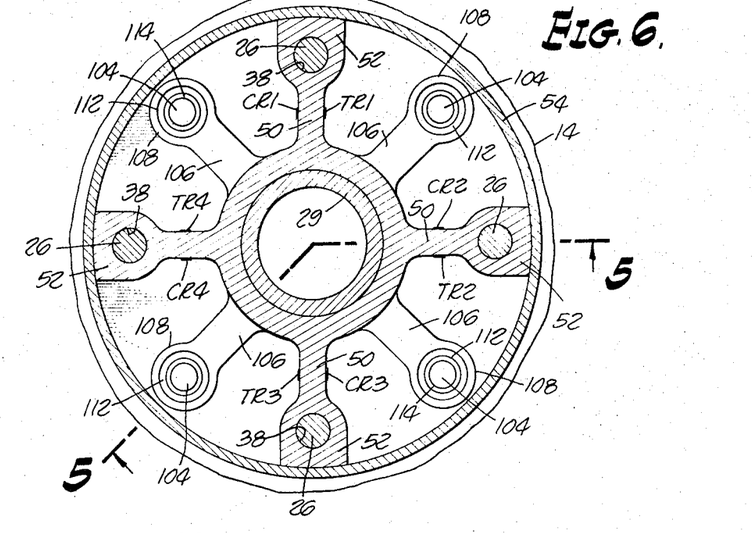
FIG. 6 is a horizontal sectional view, partly in plan, taken along the line 6—6 of FIG. 5.
Figure 7:
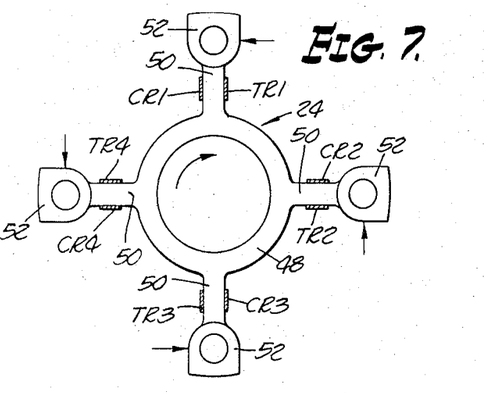
FIG. 7 is a schematic representation of the strainable coupling members shown in FIGS. 1, 2, 5 and 6 with strain detection elements mounted therewith.

FIGS. 5 and 6 illustrate an alternate embodiment of drilling apparatus 10 and Kelly drive assembly 20 including the torque detection apparatus of the present invention. Components of such alternate embodiment which corresponds to like components shown in FIGS. 1–4 are designated with the same numbers.

In this alternate embodiment the master bushing 18 is provided with a plurality of drive sockets 102 circumferentially disposed about the axis of master bushing 18, as shown, in lieu of the central drive socket previously described. The sockets 102 are adapted to receive a plurality of drive pine 104, shown in FIGS. 5 and 6. Kelly coupling member 24 is provided with additional drive arms or beams 106 which radially extend from hub 48 and terminate in bosses 108 having holes 110 which receive one end of the drive pins 104. In this embodiment, closure member 56 is provided with holes through which drive pins 104 extends. Shoulders 113 are provided on drive pins 104 which retain closure member 56 in proper position. Drive pins 104 and closure member 56 are connected to bosses 108 by means of retainers 112. Retainers 112 are locked into place by means of welds 114.

In this embodiment torque is transmitted through drive member 14, master bushing 18, drive pins 104, arms 106, hub 48, beams 50, pins 26, Kelly base 30 and so on as previously described.

The function of the deflection beams 50 and the strain resistors TR1 – TR4 and CR1 – CR4 is the same in the embodiments of both FIGS. 1–2 and FIGS. 5–6.

Also shown in FIG. 5 is a variation of the radio transmission-receiving structure shown in FIG. 1. As shown, there is provided a transmitter antenna 118 disposed around housing 54 and mounted in an insulating carrier 120. Suitable brackets 122 support and protect the carrier 120 with housing 54 and a suitable connection is made with the transmitter unit 68 (not shown). Mounted with the drilling structure (not shown) in line-of-sight relation with transmitter antenna 118 is a receiver antenna 124. Receiver antenna 124 is mounted in an insulating carrier 126. A bracket 128 supports carrier 126 in protected relation. In this embodiment the receiver antenna could be substituted by a whip type antenna (not shown) such as previously described with reference to FIG. 1a.

SENSING, TRANSMISSION AND RECEIVING SYSTEM

Referring now to FIGS. 7–10, and first to FIG. 7, previous description has shown that torque stress induced in the kelly coupling member 24 imposes consequent strain in the beams 50, such strain being an essentially linear function of such torque. The strain resistors or gauges TR1 – TR4 and CR1 – CR4, which may be of the standard 350 ohm foil or wire type, for example, are cemented or otherwise integrally attached to the beams 50. As shown, the strain resistors TR1 – TR4 exhibit an increase in resistivity corresponding to increase in strain in beams 50 and the strain resistors CR1 – CR4 exhibit a decrease in resistivity corresponding to increase in strain in such beams.

Figure 8:
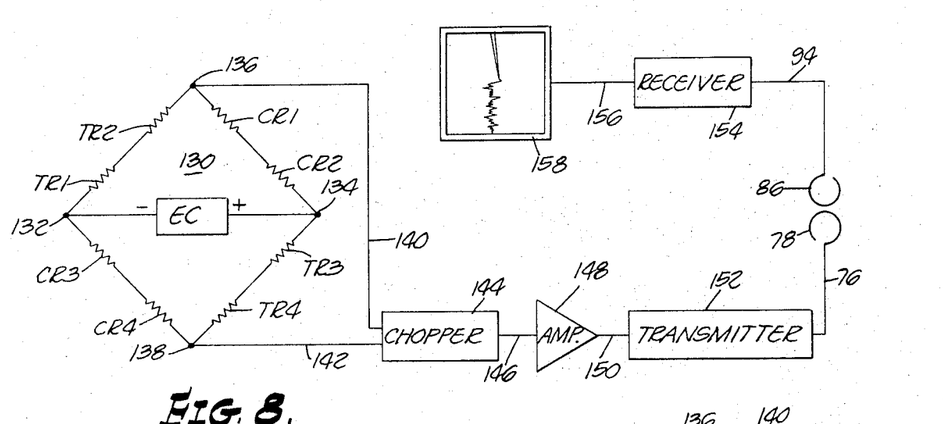
FIG. 8 is a schematic illustration of the sensing detection, transmission, receiving and indicating circuitry incorporated in the torque measuring system illustrated in FIGS. 1, 2, 5 and 6.

Referring to FIG. 8, the strain resistors TR1 – TR4 and CR1 – CR4 are seen to be incorporated into a bridge circuit 130 wherein TR1 and TR2 are connected into one arm of the bridge with TR3 and TR4 connected into an opposing arm of the bridge. Likewise, CR1 and CR2 are connected into another arm of the bridge with CR3 and CR4 connected into another opposing arm.

A source of direct constant voltage, designated EC, is connected to opposing terminals 132 and 134 of the bridge to provide an essentially constant current flow through the bridge circuit independent of resistivity variations of the strain resistors and independent of temperature within a workable range.

An increase in resistivity exhibited by strain resistors TR1 – TR4, caused by increase torque in coupling 24 and resulting strain in beams 50, results in a corresponding increase in potential voltage at the other opposing terminals 136 and 138 of the bridge. A decrease in resistivity exhibited by strain resistors CR1 – CR4, also caused by increased torque in coupling 24 and resulting strain in beams 50, also results in a corresponding increase in potential voltage at terminals 136 and 138 of the bridge which is cumulative with the potential voltage change caused by the strain resistors TR. A decrease in torque and resulting strain in beams 50 serve to reverse the action described above.

The feature of cumulative or essential "doubling" of the potential voltage corresponding to applied torque as provided by bridge circuit 130 as shown, is useful in attaining increased sensitivity in the quantitative measurement of applied torque and the torque variations and peaks. Also of note, in reference to FIGS. 7 and 8, is that all the strain resistors, both direct and inverse acting, are disposed in the same thermal environment so that resistance variations caused by temperature changes are inherently compensated without drift.

Voltage terminals 136 and 138 of bridge circuit 130 are connected through leads 140 and 142 into a chopper circuit 44 which is provided to convert the direct current voltage appearing across terminals 136 and 138 into an alternating current voltage or an interrupted direct current voltage. The output of chopper 144 is connected through a suitable connection 146 into an amplifier 148. The output of amplifier 148 is connected though a suitable connection 150 into a radio transmitter circuit 152 as a modulating voltage corresponding to the torque and torque variations induced in coupling 24. The output of transmitter 152 is connected through a suitable connection or lead 76 to an antenna 78, previously referenced with FIGS. 1 and 2.

The radio signal emanating from transmitter antenna 78 is electrostatically or radiocoupled to receiver antenna 86. Line-of-sight coupling of antenna 78 and 86 is desirable, particularly when utilizing the higher transmission frequencies, but is not essential for the operation of some embodiments of the invention.

Receiver antenna 86 is connected through a suitable connection or leads 94 into a receiver circuit 154 which converts the received signal into a voltage corresponding to the torque induced in Kelly coupling member 24. The output of receiver 154 is connected through a connection 156 into an indicator and/or recorder apparatus 158. The output alternately may be connected into a well drilling apparatus control system (not shown) as well as other automated control systems.

Further information concerning the sensing, transmitter and receiver system of FIG. 8 as described above, is available through reference to STRAIN MEASUREMENT, as previously mentioned, the same being expressly incorporated herein by reference.

Figure 9:
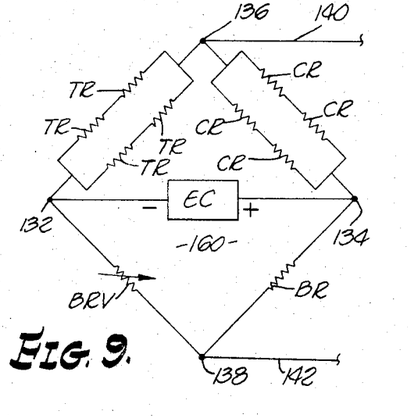
FIG. 9 is a schematic illustration of another sensing circuit suitable for incorporation into the circuitry shown in FIG. 8.
Figure 10:
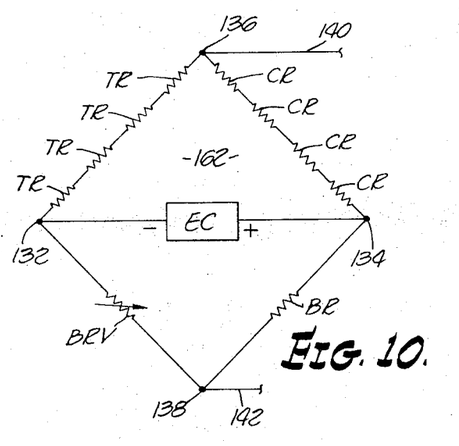
FIG. 10 is a schematic illustration of still another sensing circuit suitable for incorporation in the circuitry shown in FIG. 8.
Figure 11:
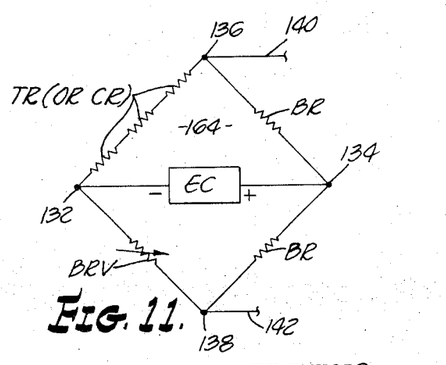
FIG. 11 is a schematic illustration of yet another sensing circuit suitable for incorporation into the circuitry shown in FIG. 8.

FIGS. 9, 10 and 11 illustrate alternate embodiments of bridge circuits which are operable in lieu of bridge circuit 130 shown in FIG. 8. Where applicable, the same or similar identification as shown in FIG. 8 is assigned to like elements.

An alternate bridge sensing circuit 160 is shown in FIG. 9. As shown, the tension strain resistors TR are connected in a series-parallel arrangement in one arm of the bridge and the compression strain resistors CR are connected in a series-parallel arrangement in another arm of the bridge. To complete the bridge circuit 160, a balance resistor BR is connected into the arm of the bridge opposing the strain resistors TR and a variable balance resistor BRV is connected into the arm of the bridge opposing the strain resistors CR. The purpose of the variable resistor or potentiometer BRV is to balance or calibrate the bridge 160. Bridge 160 as shown does not exhibit the same magnitude or cumulative voltage at terminals 136 and 138 as does coupling 130 but, when connected with coupling member 24, exhibits compensating characteristics which contribute to the linearity and temperature stability of the system. As with bridge 130, bridge 160 is inherently compensated against drift caused by temperature variations. Other than noted above, bridge circuit 160 functions in the torque measuring system of the present invention as previously described with reference to FIGS. 7 and 8.

Another alternate bridge sensing circuit 162 is shown in FIG. 10. The construction and function of bridge 162 is similar to that of bridge 160 except that the strain resistors TR and CR are connected in a straight series relation. Bridge 162 is also temperature compensated and exhibits a greater cumulative voltage change with torque variation than does bridge 160. An advantage of the provision of the arrangement of bridge 162 is that, when used in the torque measuring system of the invention, one to several beams 50 may be provided for coupling member 24 with each beam having connected therewith respective strain resistors TR and CR. Thus, bridge 162 would be provided within provision of three beams 50 in coupling member 24.

Yet another alternate bridge sensing circuit 164 is shown in FIG. 11. Bridge 164 is similar to bridge 162 with the exception that another balance resistor BR is substituted for strain resistors in one arm of the bridge 164 and all the strain resistors are connected into only one arm of the bridge. Such strain resistors can be either tension strain resistors TR or compression strain resistors CR and in varied numbers corresponding to the number of beams 50 provided in coupling member 24. Bridge 164 otherwise functions as previously described.

In operation the system as shown is properly calibrated in an appropriate range or ranges in a manner and with suitable calibration apparatus (not shown) as may be required.

The foregoing description and drawing will suggest other embodiments and variations to those skilled in the art, all of which are intended to be included in the spirit of the invention as herein set forth.

That being claimed is:

1. A subterranean well drilling system comprising: a rotatable driving means, rotatable driven means, a rotatable strainable elastic torque coupling means including central torque transfer means connected to radially extending force transfer arm means and to radially extending strainable elastic force responsive beam means, and peripheral torque transfer means connecting said force transfer arm means and said force responsive beams means between said driving means and said driven means, strain detection means and a transmitting means coupled therewith connected with said coupling means to be carried in rotation by said coupling means for continuously detecting strains imposed in said coupling means by torque induced between said driving means and said driven means and for transmitting a radio output indicative thereof, and stationary radio receiving means radiocoupled with said transmitting means for receiving and indicating said output as a function of torque and torque variations between said driving means and said driven means.

2. The system of claim 1 wherein said strain detection means include means connecting said strain detection means with said force responsive beam means.

3. The system of claim 2 wherein said strain detection means includes an electrical resistance bridge circuit incorporating strain resistors.

4. The system of claim 2 wherein said detection means and said transmitting means include an electrical bridge incorporating strain resistors connected with said force responsive beam means, a source of constant electrical current for exciting said bridge, means connecting a potential voltage appearing across said bridge into a modulating voltage, transmitter means responsive to said modulating voltage and including a radio transmitting antenna for emanating a radio signal having correlation with said potential voltage, and receiving means including a receiving antenna for receiving said radio signal and converting said radio signal into an electric signal.

5. The system of claim 4 wherein said transmitting antenna and said receiving antenna are mounted in line-of-sight relation and in radio-shielded relation.

6. The system of claim 4 wherein said strain resistors comprise tension strain resistors and compressive strain resistors connected in cumulative potential voltage relation with said bridge.

7. A subterranean well drilling system comprising: a rotatable driving means, a rotatable driven means, a rotatable strainable elastic torque coupling means including a hub, force transfer arms radially connected to said hub, strainable deflection beams radially connected to said hub, and boss and pin means connecting said force transfer arms and said strainable deflection beams between said driving means and said driven means, strain detection means and a transmitting means coupled therewith connected with said coupling means to be carried in rotation by said coupling means for continuously detecting strains imposed in said coupling means by torque induced between said driving means and said driven means and for transmitting a radio output indicative thereof, and stationary radio receiving means radiocoupled with said transmitting means for receiving and indicating said output as a function or torque and torque variations between said driving means and said driven means.

8. The system of claim 7 wherein said detection means includes means connecting said detection means with said strainable deflection beams.

9. The system of claim 8 wherein said detection means includes an electrical bridge circuit incorporating strain resistors attached to said deflection beams.

10. The system of claim 7 wherein said detection means and said transmitting means include an electrical bridge incorporating strain resistors connected with said deflection beams, a source of constant electrical current for exciting said bridge, means converting a potential voltage appearing across said bridge into a modulating voltage, transmitter means responsive to said modulating voltage and including a radio transmitting antenna for emanating a radio signal having a correlation with said potential voltage, and receiving means including a receiving antenna for receiving said radio signal and converting said radio signal into an electrical signal.

11. The system of claim 10 wherein said transmitting antenna and said receiving antenna are mounted in line-of-sight relation and in radio-shielded relation.

12. The system of claim 10 wherein said strain resistors comprise tension strain resistors and compressive strain resistors connected in cumulative potential voltage relation within said bridge.

13. A subterranean well drilling system comprising: a rotatable driving means, a rotatable driven means, a rotatable strainable elastic torque coupling means connected between said driving means and said driven means, strain detection means and a transmitting means coupled therewith connected with said coupling means to be carried in rotation by said coupling means for continuously detecting strains imposed in said coupling means by torque induced between said driving means and said driven means and for transmitting a radio output indicative thereof, an elongated sleeve means connected with said coupling means and extending through said driving means, a radio transmitting antenna included with said transmitting means mounted with the extended end of said sleeve means, and stationary radio receiving means including a radio receiving antenna means mounted with said drilling system and radiocoupled in line-of-sight relation with said transmitting antenna, the structure of said drilling system serving to shield said transmitting antenna and said receiving antenna from extraneous radio interference, whereby said receiving means can receive and indicate said radio output as a function of torque variations between said driving means and said driven means.

14. A torque responsive structure adapted for connection between driving means and driven means including a first central torque transfer means connected with said driving means, a second, peripheral torque transfer means connected with said driving means, strainable elastic driving beam means extending in cantilever posture from said first central torque transfer means, said second torque transfer means connecting said beam means with said driven means, whereby strain imposed in said elastic driving beam means corresponds to torque induced between said driving means and said driven means.

15. The structure of claim 14 wherein said driving means comprise rotary drilling drive means and said driven means comprise drill string Kelly drive means.

16. A drilling torque measuring system for a rotary drilling rig comprising:
rotatable driver means having a central bore,
means for rotatably mounting said driver means for rotation of said driver means about its vertical axis,
driven means disposed above said driver means, said driven means having a central bore and means adapted for engagement with a well drilling means extendable through said bore, torque responsive means interconnecting said driver means and said driven means and including radially disposed beam members, strain detection means disposed on said beam members for detecting flexure of said beam members, wireless transmitting means responsive to said detective means for developing radio transmission signals as a function of torque and torque variations between said driver means and said driven means, means for supporting said transmitting means relative to said driven means so that said transmitting means are rotatable with said driven means, radio receiving means radiocoupled in a line-of-sight relation with said transmitting means for receiving radio transmissions from said transmitting means, and means for providing radio frequency shielding of said receiving means for minimizing reception of interfering and extraneous radio signals.

17. The system of claim 16 wherein said torque responsive means includes a hub connected to said driver means, and said beam members are connected to said hub in cantilever posture and pin means connect said beam members to said driven means.

18. The system of claim 16 wherein said strain detection means are strain resistors coupled into an electrical bridge for producing a cumulative electrical response.

19. A drilling torque measuring system for a rotary drilling rig comprising:

table means, a rotary drive housing rotatably supported in said table means and adapted to be rotated by a power means, said drive housing having a central bore, a master bushing received in said housing bore and fixed therein against relative rotation, said master bushing having a central bore, said bushing bore including an upper locking recess means, kelly driving means including a coupling member having a hub with locking means receivable in said locking recess means, a sleeve portion insertable through said bushing bore and beam portions extending radially outward from said hub, a base member disposed over said hub and having kelly driver means, means coupling the outer ends of said beam portions to said base member, strainable elastic force responsive means attached to said beam portions for producing electrical signals in response to flexure of said beam portions, wireless transmitting means coupled to said force responsive means and responsive thereto for producing functionally related radio transmission signals, housing means enclosing said transmitting means and force responsive means, transmitting antenna means disposed in said sleeve portion below said master bushing and coupled to said transmitting means, and receiving antenna means disposed relative to said table means for line-of-sight radio communication with said antenna means.

20. The system of claim 19 wherein said force responsive means are connected to either side of a beam portion for detecting both compression and tension of said beam portions.

21. The system of claim 20 wherein said force responsive means are strain resistors coupled into an electrical bridge for producing a cumulative electrical signal.

22. The system of claim 19 and further including receiver means coupled to said receiving antenna means for producing output signals as a function of torque and torque variations.

23. The system of claim 22 and further including indicator means responsive to receiver output signals for producing indications of torque and torque variations.

24. The system of claim 19 wherein said receiving and transmitting antenna means have an annular configuration and are generally concentric with respect to one another.

25. A torque sensing transmission system for a well drilling system comprising: a rotary drilling table means including a rotary driving member mounted within a housing, said table means providing a metal mass, said driving member having a central opening, a master bushing and kelly driving assembly disposed in said central opening, said kelly driving assembly including means for deriving electrical signals as a function of torque stress developed by the transmittal of force between said kelly driving assembly and a kelly, means responsive to said electrical signals for developing radio transmission signals, said kelly driving assembly further including a depending sleeve portion which is circumscribed by said metal mass, and transmitter antenna means on said sleeve portion electrically coupled to said developing means and being located on said sleeve portion so as to be shielded by said metal mass from extraneous radio signal interference.

26. The system of claim 25, wherein said transmitter antenna means have an annular configuration, and said system further includes an annular receiving antenna means disposed in a line-of-sight relationship with respect to said transmitter antenna means.

* * * * *